United States Patent
Rodriguez et al.

(10) Patent No.: US 7,472,289 B2
(45) Date of Patent: Dec. 30, 2008

(54) AUDIO NOISE MITIGATION FOR POWER STATE TRANSITIONS

(75) Inventors: Jorge P. Rodriguez, Portland, OR (US); Leslie E. Cline, Sunnyvale, CA (US); Barnes Cooper, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 765 days.

(21) Appl. No.: 11/019,791

(22) Filed: Dec. 21, 2004

(65) Prior Publication Data

US 2006/0132109 A1 Jun. 22, 2006

(51) Int. Cl.
*G06F 1/00* (2006.01)
*H04B 15/00* (2006.01)

(52) U.S. Cl. .............. 713/300; 713/320; 381/94.1; 381/94.5; 381/120

(58) Field of Classification Search ................ 713/300, 713/320; 381/94.1, 94.5, 120
See application file for complete search history.

(56) References Cited

U.S. PATENT DOCUMENTS

| 5,199,079 | A | * | 3/1993 | Anderson et al. ........ 381/94.5 |
| 5,307,025 | A | * | 4/1994 | Colvin et al. ............. 330/267 |
| 5,436,588 | A | | 7/1995 | Ghaffaripour |
| 5,740,453 | A | * | 4/1998 | Lada, Jr. .................. 713/300 |
| 5,796,851 | A | * | 8/1998 | Hewitt et al. ............. 381/94.5 |
| 5,887,177 | A | | 3/1999 | Heyl |
| 6,118,336 | A | * | 9/2000 | Pullen et al. .............. 330/10 |
| 6,255,904 | B1 | * | 7/2001 | Capodivacca et al. ....... 330/51 |
| 6,281,821 | B1 | * | 8/2001 | Rhode et al. .............. 341/144 |
| 6,525,594 | B2 | * | 2/2003 | Fugate et al. .............. 327/534 |
| 6,650,594 | B1 | * | 11/2003 | Lee et al. ............... 365/233.15 |
| 6,710,820 | B2 | | 3/2004 | Hida |
| 6,775,387 | B1 | * | 8/2004 | Mavencamp et al. ....... 381/120 |
| 7,254,244 | B2 | * | 8/2007 | Henson et al. ............. 381/120 |
| 2001/0019366 | A1 | | 9/2001 | Hida |
| 2003/0217295 | A1 | | 11/2003 | Sadowski |
| 2004/0181700 | A1 | | 9/2004 | Katoh et al. |

OTHER PUBLICATIONS

Brake, Cliff, Power Management in Portable ARM based Systems, Dec. 11, 2002, pp. 1-5.*
Notification of Transmittal of the International Search Report and The Written Opinion of the International Searching Authority, or the Declaration, dated May 17, 2006.

* cited by examiner

*Primary Examiner*—Mark Connolly
(74) *Attorney, Agent, or Firm*—Kacvinsky LLC

(57) ABSTRACT

An audio noise mitigation approach. For one aspect, a first voltage associated with a first power management state is provided. A signal responsive to an indication associated with at least a first type of periodic exit event is received and responsive to the signal, a transition to a second voltage associated with a second state is initiated, a rate of the transition to the second voltage being slower than a similar voltage transition initiated in response to a non-periodic exit event.

25 Claims, 8 Drawing Sheets

US 7,472,289 B2

AUDIO NOISE MITIGATION FOR POWER STATE TRANSITIONS

BACKGROUND

An embodiment of the present invention relates to the field of electronic systems and, more particularly, to an approach and system for mitigating audio noise associated with power state transitions.

Currently, fast low power state exit slew rates are used, regardless of whether the reason for exiting from the low power or power management state is to service a timer expiration interrupt or a hardware driven interrupt.

Timer driven interrupts are periodic in nature and thus, may be a primary cause of audio noise associated with power state transitions.

BRIEF DESCRIPTION OF THE DRAWINGS

The present invention is illustrated by way of example and not limitation in the figures of the accompanying drawings in which like references indicate similar elements, and in which.

DETAILED DESCRIPTION

A method, apparatus and system for audio noise mitigation for power state transitions is described. In the following description, particular components, circuits, state diagrams, power and/or power management states, software modules, systems, timings, etc. are described for purposes of illustration. It will be appreciated, however, that other embodiments are applicable to other types of components, circuits, state diagrams, power and/or power management states, software modules, systems, and/or timings, for example.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In today's typical mobile personal computer environment, the operating system's built-in power management software interface, which may be, for example, ACPI (Advanced Configuration and Power Interface), may detect a time slot where there are no new or pending interrupts to the mobile processor. A power management policy associated with the interface may then use a chipset feature or other feature set to place the mobile processor into a very low, idle power state. For some implementations using ACPI, this may be a Deeper Sleep or C4 state.

Once the processor is placed into this C4 or other low power state, a break event or interrupt from the operating system may be sent to the chipset (e.g. the input/output controller or input output control hub) or another controlling entity that allows the processor to exit the low power/idle state.

Some events that may cause a processor to exit the low power/idle state occur in a periodic fashion. An example of such an event may include expiration of a timer. The periodic exit from the C4 or another low power/idle state (followed by re-entry into the power management state and exit again upon occurrence of the periodic event) may happen in a frequency range within the audible spectrum (i.e. 20 Hz to 20 KHz).

As a particular example, when exiting the C4 state in a computing system supporting ACPI, a voltage regulator providing a supply voltage to the processor of interest may be controlled to increase the voltage to the processor from a lower C4 supply voltage to a higher active mode voltage associated with the C0 state, for example. An example of a conventional "Buck" voltage regulator 100 that may support this transition is shown in FIG. 1 for purposes of illustration.

Figure 1:
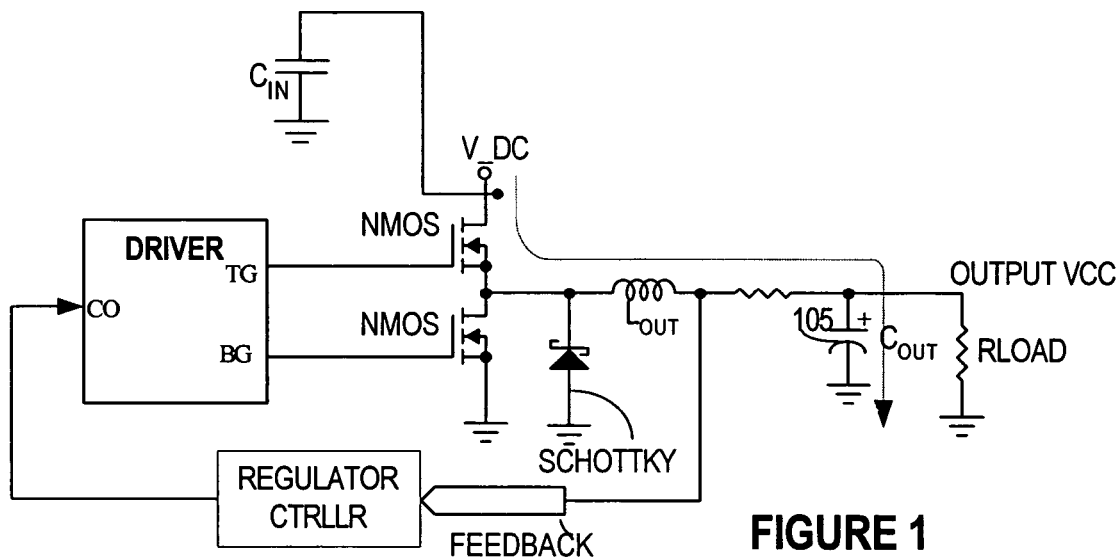
FIG. 1 is a schematic diagram illustrating a conventional voltage regulator.

This increase in voltage ("dv") from the lower C4 voltage to the higher C0 voltage requires a demand for charge to bring the output bulk capacitors, e.g. capacitor 105 in FIG. 1, to the higher voltage. In Equation 1 below, the current through the inductor $L_{OUT}$ ($I_L$) is proportional to the size of the output capacitor $C_{OUT}$ 105 and the slew rate, dv/dt, being required of the voltage regulator 100.

$$I_L = C_{OUT} \times dv/dt \qquad \text{Equation 1}$$

For purposes of illustration, where $C_{OUT}$ is about 3000 uF and the slew rate dv/dt is about 900 mv/80 us, the current $I_L$ may be 34 A, for example. It will be appreciated that different values for these variables may apply to different platforms.

Future processors and platforms are likely to exhibit the following trends: 1) processors that require larger current consumption will require larger capacitance as part of their voltage regulator designs, 2) as low power exit times continue to decrease, performance of the platform will continue to increase, and 3) lower voltages will continue to be desired for low power states. These trends indicate that currents needed to charge the output capacitors during a C4 or other low power state exit are likely to be on the rise.

Because the periodic entry and exit of C4 and other low power states in various systems may happen in the audible frequency spectrum, and because of the amount of charge being moved back and forth through the voltage regulator, as mentioned above, there may be audible noise due to these transitions that may be capable of being heard even above system background noises (e.g. disk drives and fans). This is due to the large current associated with such transitions (per Equation 1 above) that can make printed wiring boards, output inductors and other components resonate at C4 or other low power state entry/exit frequency.

Further, lower cost and commonly used input decoupling Multi-Layer Ceramic Chip (MLCC) capacitors exhibit Piezoelectric phenomenon. This essentially makes them resonate at their natural frequency given a large current transient, such as on a low power state exit, in the presence of a large electric field, such as may be provided by the alternating current (AC) brick input of a laptop ~19V tied to the V_DC input in FIG. 1. For this example, the typical natural frequency is in the ~10 KHz range, which may be quite annoying to the user.

The audio noise associated with these transitions is proportional to the charge currents mentioned above: the higher the current, the louder the noise. With existing trends, voltage regulator designs are likely to require higher capacitance for future processors. Referring back to Equation 1, then, where the capacitance is higher, to lower the charge current, and therefore, reduce the associated audio noise, the dv/dt, or slew rate, may need to be lowered.

Figure 2:
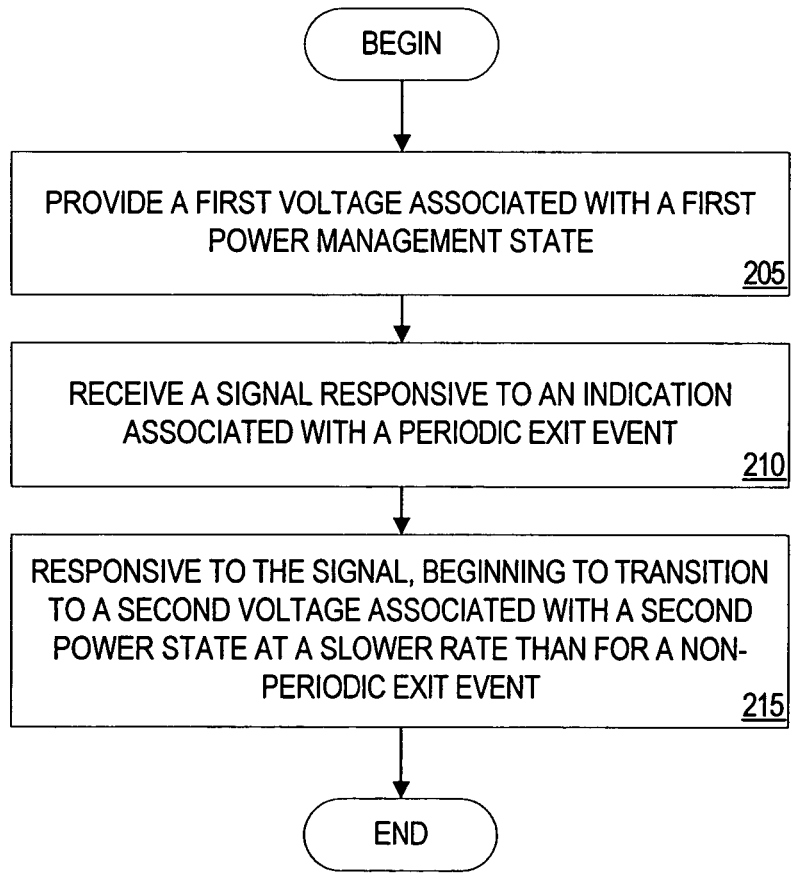
FIG. 2 is a flow diagram illustrating the audio noise mitigation approach of one embodiment.

For one embodiment, referring to FIG. 2, a first voltage associated with a first power management state is provided by a voltage regulator or other voltage source at block 205. The first power management state may be, for example, a Deeper Sleep (C4) state or another power management state. At block 210, a signal responsive to an indication associated with a periodic exit event is received. At block 215, responsive to the signal, a transition to a second voltage associated with a second power state is initiated, a rate of the transition to the second voltage being slower than a rate of a similar transition in response to a non-periodic exit event.

Exit event as the term is used herein may refer to an interrupt, break event or other condition that may cause an electronic component to transition from a first power state to a second power state. Further details of this and other embodiments are provided in the description that follows.

Embodiments of the invention may be implemented in one or a combination of hardware, firmware, and software. Embodiments of the invention may also be implemented in whole or in part as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Figure 3:
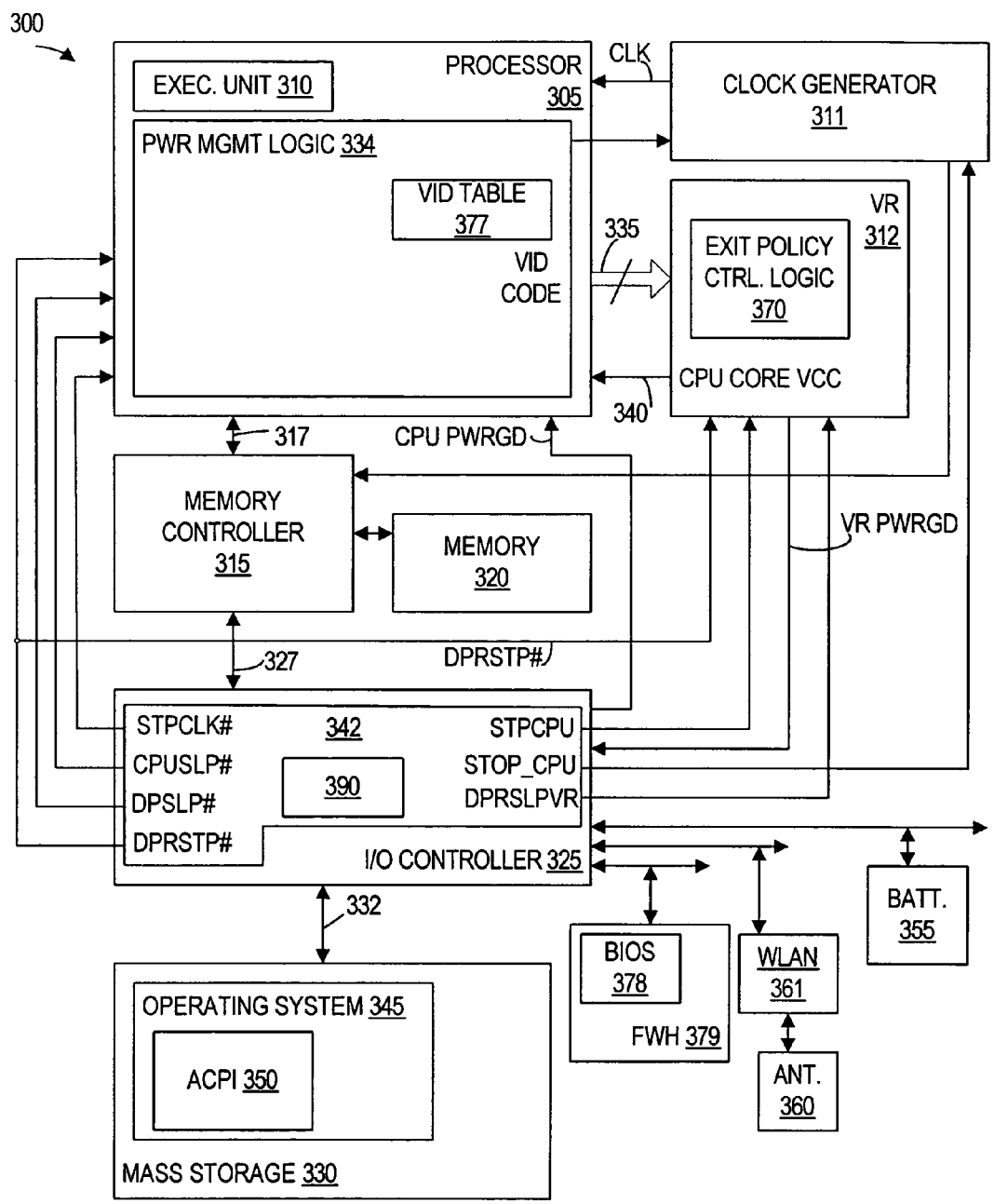
FIG. 3 is a block diagram illustrating an example electronic system that may advantageously implement the audio noise mitigation approach of one embodiment.

FIG. 3 is a block diagram of an example system 200 that may advantageously implement the audio noise mitigation approach of one or more embodiments. The system 200 is a notebook or laptop computing system, but other types of electronic systems, such as personal digital assistants, wireless telephone/handsets and/or desktop or enterprise computing systems, for example, may be implement one or more audio noise mitigation approaches described herein for other embodiments.

The system 300 includes at least one processor 305, a platform-level clock generator 311, a voltage regulator 312 coupled to the processor 305, a memory controller 315 coupled to the processor 305 over a bus 317, which may be a point-to-point bus or a switched fabric, for example, a memory 320 which may comprise one or more of random access memory (RAM), flash memory and/or another type of memory, an input/output (I/O) controller 325 coupled to the memory controller 315 over a bus 327, and a mass storage device 330 coupled to the I/O controller 325 over a bus 332.

For one embodiment, the processor 305 may be an Intel® architecture microprocessor such as, for example, an Intel Pentium® M processor or follow-on processor to the Intel Pentium® M processor including one or more processing cores and at least one execution unit 310 to process instructions. For such embodiments, the processor 305 may include or support Intel SpeedStep® technology or another power management-related technology that provides for two or more voltage/frequency operating points. An associated power management unit 334 may be included on the processor 305 to control transitions between two or more of the voltage/frequency pairs.

For other embodiments, the processor 305 may be a different type of processor such as a digital signal processor, an embedded processor, or a microprocessor from a different source and/or multiple processors may be included.

A voltage identification (VID) memory 377 that is accessible by the power management logic 334 may be included to store a voltage identification code look-up table. The VID memory 377 may be an on- or off-chip register or another type of memory, and the VID data may be loaded into the memory via software, basic input/output system (BIOS) code 378 (which may be stored on a firmware hub 379 or in another memory), an operating system, other firmware and/or may be hardcoded, for example. Alternatively, a software look-up table including VID and related data may be otherwise accessible by the logic 334.

The voltage regulator 312 provides a supply voltage to the processor 305 and may be in accordance with a version of the Intel Mobile Voltage Positioning (IMVP) specification, such as IMVP-6 or a follow-on version, for example. For such embodiments, the voltage regulator 312 may be coupled to receive VID signals from the processor 305 over a bus 335 and, responsive to the VID signals, provide an associated supply voltage to the processor 305 over a signal line 340. The voltage regulator 312 may include Deeper Sleep logic 370 that is responsive to one or more signals to provide a Deeper Sleep voltage to the processor 305. For other embodiments, a different type of voltage regulator may be used, including a voltage regulator in accordance with a different specification. Further, for some embodiments, the voltage regulator may be integrated with another component of the system 300 including the processor 305.

The memory controller 315 may include both graphics and memory control capabilities and may alternatively be referred to herein as a graphics and memory controller, graphics and memory control hub (G/MCH) or a North bridge. The graphics and memory controller 315 and the I/O controller 325 (which also may be referred to as an I/O control hub or South bridge) may be collectively referred to as the chipset. For other embodiments, chipset features may be partitioned in a different manner and/or may be implemented using a different number of integrated circuit chips. For example, for some embodiments, graphics and memory control capabilities may be provided using separate integrated circuit devices.

The I/O controller 325 of one embodiment includes power management state control logic 342, which may alternatively be referred to herein as C-state control logic. The power management state control logic 342 may control aspects of the transitions between some power management and/or normal operational states associated with the processor 305, either autonomously or in response to operating system or other software or hardware events. For example, for Intel® architecture processors for which at least active mode and power management states referred to as C0, C1, C2 and C4 are supported, the power management state control logic 342 may at least partially control transitions between at least a subset of these states using one or more of a stop clock (STPCLK#), processor sleep (CPUSLP#), deep sleep (DPSLP#), deeper stop (DPRSTP#), and/or stop processor (STPCPU#) signals as described in more detail below.

For other types of architectures and/or for processors that support different power management and/or normal operational states, the power management state control logic 342 may control transitions between two or more different power management and/or normal operational states using one or more signals that may be similar to or different from the signals shown in FIG. 3.

The mass storage device 330 may include one or more compact disc read-only memory (CD-ROM) drive(s) and associated disc(s), one or more hard drive(s) and associated disk(s) and/or one or more mass storage devices accessible by the computing system 300 over a network. Other types of mass storage devices such as, for example, optical drives and associated media, are within the scope of various embodiments.

For one embodiment, the mass storage device 330 stores an operating system 345 that includes code 350 to support a current and/or a follow-on version of the Advanced Configuration and Power Interface (ACPI) specification. ACPI may be used to control some aspects of power management as described in more detail below. The operating system 345 may be a Windows™ or another type of operating system available from Microsoft Corporation of Redmond, Wash. Alternatively, a different type of operating system such as, for example, a Linux operating system, and/or a different type of operating system-based power management may be used for other embodiments. Further, the power management functions and capabilities described herein as being associated with ACPI may be provided by different software or hardware.

Where the system 300 is a mobile or portable system, a battery or battery connector 355 may be included to provide power to operate the system 300 either exclusively or in the absence of another type of power source. Additionally, for some embodiments, an antenna 360 may be included and coupled to the system 300 via, for example, a wireless local area network (WLAN) device 361 to provide for wireless connectivity for the system 300.

It will be appreciated that the system 300 and/or other systems of various embodiments may include other components or elements not shown in FIG. 3 and/or not all of the elements shown in FIG. 3 may be present in systems of all embodiments.

The audio noise mitigation approach of some embodiments is now described in reference to FIGS. 3-6.

In operation, the processor 305 may transition between various power states responsive to various events and conditions.

Figure 4:
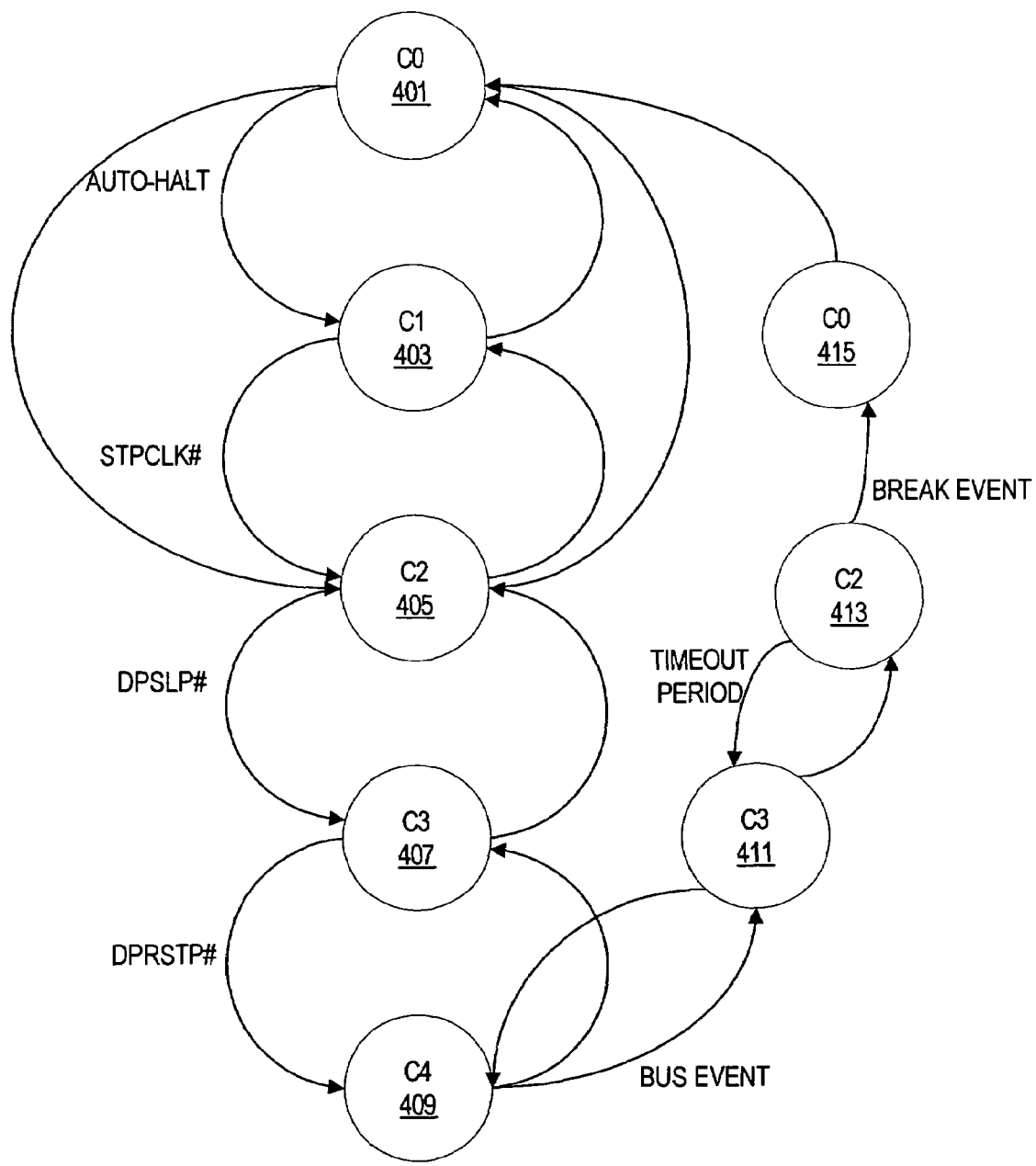
FIG. 4 is a state diagram illustrating various power states that may be used for the system of FIG. 3.

FIG. 4 is a state diagram illustrating example transitions between various C-states in which the processor 305 of FIG. 3 may operate for one embodiment. It will be appreciated that, for other embodiments using a different power management approach, FIG. 4 may not be representative of the states and transitions supported. Further, for some embodiments, there may a larger or smaller number of power states between which the processor transitions.

For the embodiment shown in FIG. 4, the normal operational state or active mode for the processor 305 is the C0 state 401 in which the processor actively processes instructions. In the C0 state, for one embodiment, the processor is in a high-frequency mode (HFM) in which the voltage/frequency setting for the processor may be provided by a maximum voltage/frequency pair (e.g. for processors that support Intel SpeedStep® technology).

In order to conserve power and/or reduce thermal load, for example, the processor 305 may be transitioned to a lower power state whenever possible. For example, from the C0 state, in response to firmware, such as microcode, or software, such as the operating system 345, executing a HALT or MWAIT instruction (not shown), the processor 305 may transition to the C1 or Auto-HALT state 403. In the C1 state, portions of the processor 305 circuitry may be powered down and local clocks may be gated.

The processor may transition into the C2 state 405, also referred to as the stop grant or SLEEP state, upon assertion of the STPCLK# or similar signal by the I/O controller 325, for example. The I/O controller 325 may assert the STPCLK# signal in response to the operating system 345 determining that a lower power mode may be or should be entered and indicating this via ACPI software 350. In particular, one or more ACPI registers (not shown) may be included in the I/O controller 325 and the ACPI software 350 may write to these registers to control at least some transitions between states. During operation in the C2 state, portions of the processor 305 circuitry may be powered down and internal and external core clocks may be gated. For some embodiments, the processor may transition directly from the C0 state 401 into the C2 state 405 as shown.

Similarly, the processor 305 may transition into the C3 state 407, also referred to as the Deep Sleep state, in response to the I/O controller 325 or other chipset feature asserting a CPUSLP# signal and then a DPSLP# signal or other similar signals. In the Deep Sleep state, in addition to powering down internal processor circuitry, all phase-lock loops (PLLs) in the processor 305 may be disabled. Further, for some embodiments, a STOP_CPU signal may be asserted by the input/output controller 325 and received by the clock generator 311 to cause the clock generator to halt the clock signal CLK to the CPU 305.

In the system 300 of FIG. 3, a transition to the C4 or Deeper Sleep state 409 may be undertaken in response to ACPI software 350 detecting that there are no pending processor interrupts, for example. ACPI software may accomplish this by causing the ICH 325 to assert one or more power management-related signals such as the example Deeper Stop (DPRSTP#) signal. For some embodiments, a Deeper Sleep Voltage Regulator (DPRSLPVR) signal provided on a signal line coupled between the input/output control hub 325 and the voltage regulator 312 may be asserted concurrently to indicate to the voltage regulator 412 to enter a lower power state.

The Deeper Stop (DPRSTP#) signal of one embodiment is provided directly from the chipset to the processor and causes central power management logic 334 on the processor to initiate a low frequency mode (LFM). For the low frequency mode, the processor may transition to the minimum or another low operating frequency, for example. Where the processor includes Intel® SpeedStep® or an analogous power management technology, the minimum operating frequency may be the lowest SpeedStep technology frequency (or corresponding frequency for the analogous technology). Assertion of the DPRSTP# signal may further cause the internal VID target to be set to the minimum operating voltage, or another operating voltage associated with the C4 state and the LFM frequency as indicated by the VID table 377.

With continuing reference to FIG. 4, when the processor 305 is in one of the power management states C1-C4, certain events and/or conditions may indicate a need to transition to a higher power state.

If the processor 305 is in a C4 or Deeper Sleep state, for example, immediate hardware driven interrupts may require a relatively quick transition from a C4 voltage to an exit voltage associated with another processor state to which the processor is to transition to service the interrupt. Such interrupts, however, are asynchronous in nature, and are thus unlikely to cause the significant audio noise described above.

Low voltage state exit events that occur in a periodic fashion, as described above, represent another type of exit event that may cause the processor 305 to transition from a first low power state (such as C4) to another power state (either another power management state or a fully functional state). The processor may then transition back to the low power state, assuming events or conditions required to re-enter the power management state are present. These periodic exit events may occur due to, for example, expiration of a timer, and may cause audible audio noise having a volume that is directly proportional to the charge current of the voltage regulator 312 associated with the needed transition. The charge current is directly proportional to the rate of the respective voltage change (Equation 1) as described above.

For one embodiment, a signal responsive to an indication associated with the occurrence of a periodic exit event may be received while in a first low voltage state. This indication may also be referred to as a periodic exit event notification and may be in response to the occurrence of a periodic exit event. A slow exit policy may then be invoked that provides for a slower rate of voltage change in transitioning from the low voltage state to a higher voltage in response to a periodic exit event as compared to an exit policy that may be invoked in response to non-periodic exit events. In this manner, the charge current associated with transitioning from a lower voltage state to a higher voltage state for periodic exit events may be reduced, thereby lowering the volume of the associated audio noise.

Additionally or alternatively, for some embodiments, a periodic exit event early warning or predictive signal may be provided in advance of the occurrence of the periodic exit event. In this manner, for some embodiments, the slower transition to a target voltage for periodic exit events may be initiated earlier in response to the early warning signal or a signal responsive to the early warning signal.

For purposes of illustration, where the transition of interest is a transition from a C4 state to any one of a C0-C3 state for the system 300 of FIG. 3, the DPRSTP# signal from the input/output controller 325, or other similar signal may be responsive to the periodic exit event notification associated with a periodic exit event. For other embodiments, the DPRSTP# signal may instead or additionally be responsive to a periodic exit event early warning signal or other early warning indication.

For such embodiments, the DPRSTP# signal, in addition to being coupled between the Input/Output controller 325 and the processor 305, may also be coupled to be received by the voltage regulator 312 as shown in FIG. 3. In order for this signal to operate properly for some embodiments, robust filtering and routing may be required. The DPRSTP# signal may then be used together with the DPRSLPVR signal to indicate to the voltage regulator 312 whether a fast or slow exit policy is to be used for any particular exit from the C4 or other low power state for this example.

Once the processor is in a low power state such as the C4 state, the DPRSLPVR signal may be controlled by the control logic 342 to be deasserted in response to an immediate hardware-driven interrupt and/or other types of interrupts that require servicing in a shorter time period. The DPRSLPVR signal may also controlled to be deasserted in response to other types of exit (or break) events, including periodic exit events, but its deassertion may be delayed as compared to deassertion of the DPRSTP# signal as described in more detail below.

The DPRSTP# signal may be controlled by control logic 342 to provide a periodic exit event indication and/or warning signal in any one of a number of different ways, or responsive to any one of a number of different signals associated with a periodic exit event. Further, for some embodiments, the DPRSTP# signal may only be responsive to certain types of periodic exit events and not to others. In many current personal computing systems, for example, there are typically multiple timing sources and multiple interrupt models such as the examples provided below:

Interrupt Timing Sources: 1) Programmable Interrupt Timer (e.g. PIT-8254), 2) Real-Time Clock Periodic Interrupt (e.g. RTC-MS146818B), and 3) High Performance Event Timer (HPET).

Interrupt Models: 1) 8259 or other component implementing an Interrupt/acknowledge protocol, 2) Local APIC (advanced programmable interrupt controller) targeted, and 3) input/output (I/O) APIC targeted.

Figure 5A:
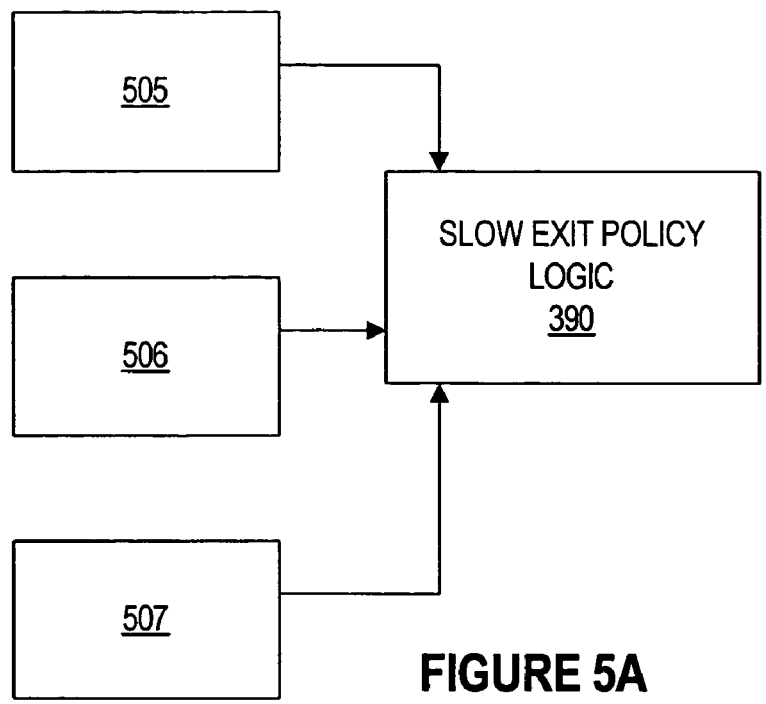
FIGS. 5A, 5B and 5C are block diagrams of example periodic event indication control logic of various embodiments that may be used to provide periodic event indication control logic for the system of FIG. 3.

These capabilities/modules may be integrated into the I/O controller 325, for some embodiments. For other embodiments, one or more of these capabilities/modules may be provided by elsewhere in the computing system 300 or may otherwise be accessible by the computing system 300.

Where the DPRSTP# or other similar signal is responsive to timing sources instead of or in addition to the interrupt models, for one embodiment, as shown in FIG. 5A, the control logic 342 may integrate logic 390 to monitor one or more interrupt masks and/or periodic interrupt enables in at least one interrupt timing source of interrupt timing sources 505, 506 and 507, which may represent, for example, the PIT, the RTC and the HPET. While three interrupt timing sources are shown in FIG. 5A, it will be appreciated that, for other embodiments that use at least one interrupt timing source as an indicator of a periodic exit event, a different number of interrupt timing sources may be used.

For embodiments for which an 8254-based Programmable Interrupt Timer (PIT) or other similar timer is used as an indicator of a periodic exit event, either alone or in combination with other indicators, the control logic 390 may monitor whether timer 0 is configured in mode 3, and use the value in timer 0 as an indicator or warning of a periodic event source. For this implementation, even and odd values may need to be handled differently. Further details of a typical 8254-based programmable interrupt timer may be found, for example, in the Intel® I/O Controller Hub 6 (ICH6) Family Datasheet available from Intel Corporation.

Where a Real-Time Clock (RTC) Periodic Interrupt is used, the control logic 390 may monitor register A in the RTC and trigger on the rate select field. If the field is non-zero, the control logic 390 may be capable of identifying a periodic interrupt rate in the system and may, for some embodiments, be able to provide an early indication of an upcoming periodic exit event to control the DPRSTP# signal. Further details of an example RTC that may be used for one embodiment may be found, for example, in the Intel® I/O Controller Hub 6 (ICH6) Family Datasheet available from Intel Corporation.

For embodiments in which the High Performance Event Timer (HPET) is used, the control logic 390 may monitor the overall enable control bit, and also detect whether timer 0 is configured in periodic mode. The control logic may then use the monitored information to determine that a periodic exit event is occurring and/or will occur soon. Further details of an example HPET that may be used to provide one of the interrupt timing sources 505-507 may be found, for example, in the Intel® I/O Controller Hub 6 (ICH6) Family Datasheet available from Intel Corporation.

For embodiments that detect a periodic event at the timer level, an advantage may be that the interrupt models may be ignored.

Figure 5B:
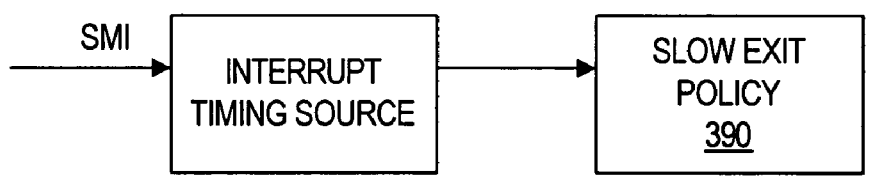

For other embodiments, as shown in FIG. 5B, a different source may be used to indicate and/or provide an early indication of a periodic exit event. For example, system software (such as a System Management Interrupt (SMI)) may periodically program an interrupt timing source, such as one of the interrupt timing sources mentioned above, and possibly the rate of the timer that is being used in the system 300. This particular implementation may result in periods of time where the slow exit capability is not enabled.

For still other embodiments, the logic 390 may trigger off the common interrupt sources used for timing services to control the DPRSTP# signal. The interrupt used for timing services, however, may be based on many sources and may use a wide variety of interrupt vectors depending on the particular interrupt model. For example, IRQ0 may be used for most 8259 interrupt model operating systems, while IRQ8 may be used for most APIC interrupt model operating systems. For future operating systems using the HPET, the interrupt generation for timer 0 may be configured for IRQ0 for use with, for example, an I/O APIC, and may also or alternatively be configured to generate a local APIC MSI (Message Signal Interrupt). This approach may also involve system software assist to program the interrupt source to monitor at any given time.

Figure 5C:
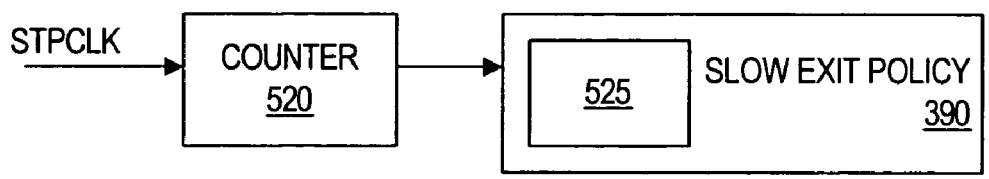

For another embodiment, as shown in FIG. 5C, the control logic 390 may be capable of monitoring and detecting periodic STPCLK# activity to control the DPRSTP# signal. For such an embodiment, a rolling counter 520 that latches on every STPCLK# deassertion event may be used. The counter value (minus some offset to allow for early break timing) may then be stored and used to trigger an early break indicator ahead of the periodic event firing. For this embodiment, some additional error avoidance logic 525 may also be included in the control logic 390 to account for sporadic injection of non-periodic events between periodic timer activity.

For still another embodiment, periodic break event sequencing may be delayed after receiving the break event indicator that a periodic break event is in progress. For this embodiment, the logic 390 may be capable of transitioning to a fast break event sequence if a non-periodic event occurs that requires faster processing.

Although multiple options for periodic exit or break event indicators, including options for early break event indication, have been described, it will be appreciated that other approaches may be used for other embodiments to control the DPRSTP# signal, or other signal responsive to an indicator associated with a periodic exit event.

Referring back to FIG. 3, for example embodiments for which the DPRSTP# signal is responsive to a periodic break event indication or warning signal, the DPRSLPVR signal or other similar signal may be used to indicate that a fast exit policy should be applied, and may take priority over the DPRSTP# signal. Tables 1 and 2 below illustrate an example exit policy control implementation that may be used for one or more embodiments. In Tables 1 and 2, the DPRSTP# signal is active low (i.e. it is indicated as being asserted with a value of 0) and is responsive to a signal associated with a periodic exit event that provides an indication of a periodic break event or early warning signal in advance of a periodic break event as described above.

TABLE 1

Truth Table

| DPRSTP# | DPRSLPVR | Desired Effect |
|---|---|---|
| 0 | 0 | N/A |
| 0 | 1 | Low Power State |
| 1 | 0 | Active C0 or Fast Exit |
| 1 | 1 | Wake VR Slow |

TABLE 2

Transition Table

| DPRSTP# | DPRSLPVR | Desired Effect |
|---|---|---|
| 1→0 | 0→1 | Low Pwr state entry |
| 1→0 | 0 or 1 | N/A |
| 1→0 | 1→0 | N/A |
| 1 | 1→0 | Wake VR Fast |
| 0 | 1→0 | N/A |
| 0→1 | 1 | Wake VR Slow |
| 0→1 | 0 | N/A |
| 0→1 | 1→0 | Wake VR Fast |

Figure 6:
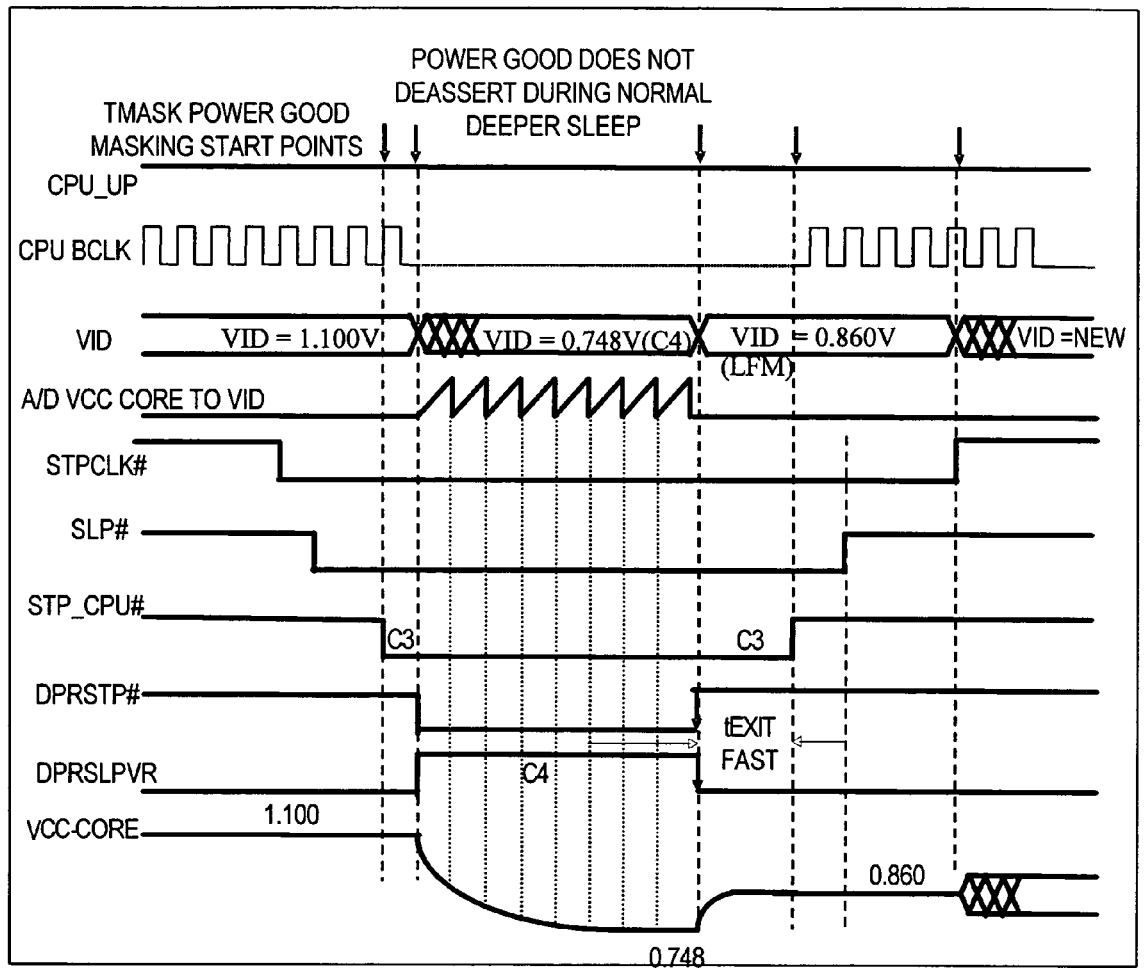
FIG. 6 is a timing diagram illustrating example timings associated with a "fast" low voltage state exit for one embodiment.

In Tables 1 and 2, "Wake VR Fast" corresponds to a fast exit policy. Example signal timings that may be used to implement a fast exit policy according to one or more embodiments are illustrated in FIG. 6. Similarly, "Wake VR Slow" in Tables 1 and 2 corresponds to a slow exit policy. An example of signal timings that may be used to implement a slow exit policy according to one or more embodiments is shown in FIG. 7.

Figure 7:
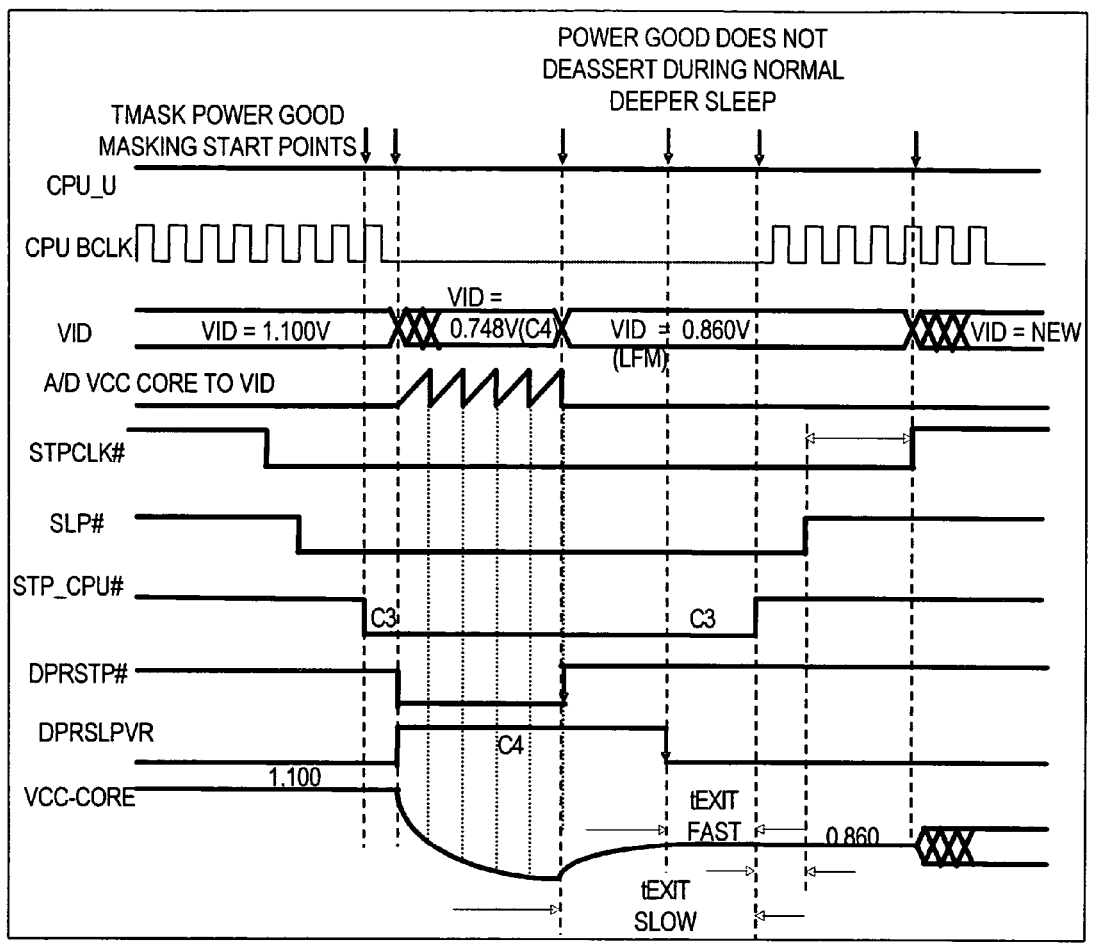
FIG. 7 is a timing diagram illustrating example timings associated with a "slow" low voltage state exit according to one embodiment.

Referring to FIGS. 6 and 7, in both cases, for the example embodiments shown, deassertion of the DPRSLPVR signal following its assertion, is responsive to an exit or break event. As shown in the example of FIG. 7, the DPRSTP# signal may be deasserted following assertion responsive to one of an indication of a periodic exit event or an early warning signal of an upcoming periodic exit event prior to the occurrence of the exit event. Deassertion of the DPRSLPVR signal may be delayed as compared to deassertion of the DPRSTP# signal as shown.

Figure 9:
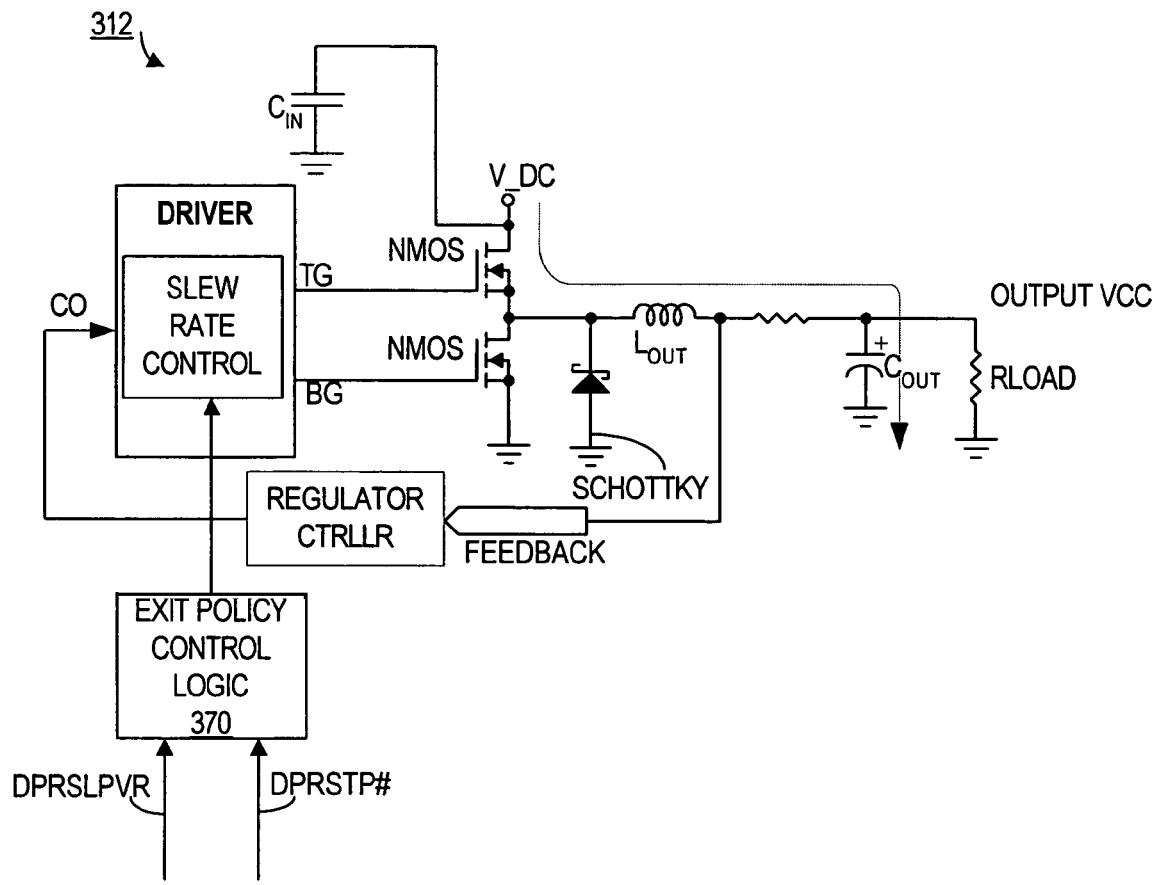
FIG. 9 is a schematic diagram illustrating example circuitry that may be implemented in the voltage regulator of FIG. 3 to provide for fast and slow exit capability for one embodiment.

The example exit policy control approach shown in Tables 1 and 2 may be implemented using exit policy control logic 370 in the voltage regulator 312 for one embodiment as shown in FIG. 9. For another embodiment, the exit policy control approach may be implemented in another component of the system 300 or using software or firmware.

Figure 8:
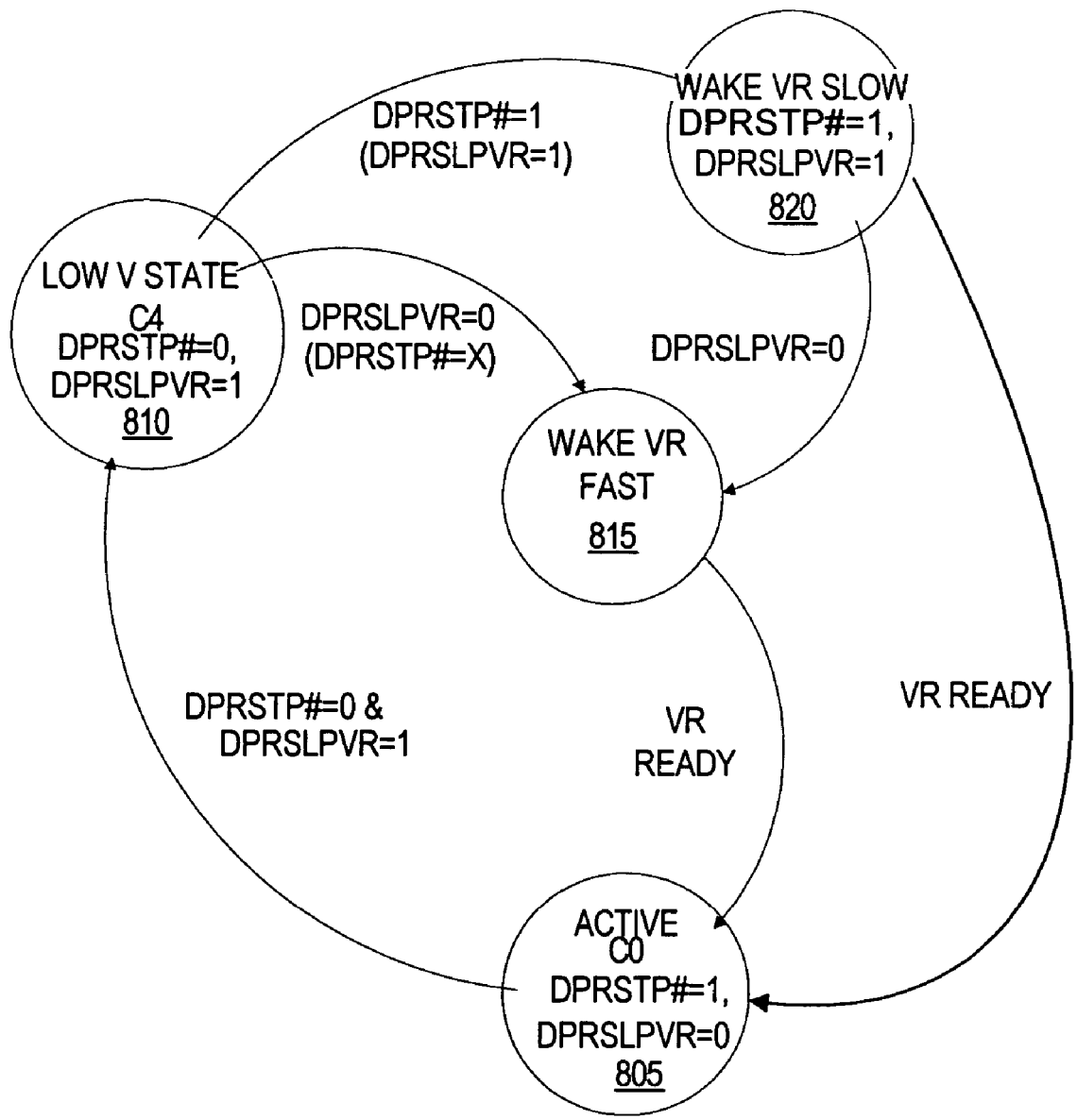
FIG. 8 is a state diagram illustrating states that may be associated with a voltage regulator of one embodiment.

FIG. 8 is a state diagram further illustrating the operation of example exit policy control logic 370 of one embodiment. Referring to Tables 1 and 2 and FIGS. 3 and 6-8, the voltage regulator 312 provides a voltage associated with an active state of the processor 305 at state 805 (FIG. 8). Both the DPRSTP# and DPRSLPVR signals are deasserted as shown.

In the active state 805, in response to assertion of both the DPRSTP# and DPRSLPVR signals, the exit policy control logic 370 transitions to a state 810 to cause the voltage regulator 312 to reduce the voltage provided to the processor 305 to a voltage corresponding with a low power state, such as the Deeper Sleep (C4) state.

From the low power state 810, if the DPRSLPVR signal is deasserted (for example in response to an immediate hardware interrupt), then the exit policy control logic 370 transitions to a state 815 causing the voltage regulator 312 to initiate a fast exit policy to transition the processor quickly from the supply voltage provided in the low power state 810 to a supply voltage associated with an active state 805. For this embodiment, the DPRSLPVR signal may take precedence over the DPRSTP# signal in controlling the exit policy such that, if the DPRSLPVR signal is deasserted from the state 810, a fast exit policy is implemented regardless of the state of the DPRSTP# signal. For some embodiments, a voltage regulator ready (VR ready) signal may be asserted once the voltage regulator output has reached a target voltage.

Referring back to state 810, if instead, the DPRSTP# signal is deasserted and the DPRSLPVR signal is not deasserted (for example, in response to a periodic exit event indication or warning signal), then the exit policy control logic transitions to a state 820 in which a slow exit policy is initiated to transition the processor supply voltage more slowly to a supply voltage associated with an active state 805. Once the voltage regulator reaches a target voltage, a VR ready signal (or VR Power Good (VR PWRGD) signal) may be asserted.

While the slow exit policy associated with state 820 is being implemented, however, if the DPRSLPVR signal is deasserted before the VR ready signal is asserted, the exit control policy logic 370 may transition to state 815 and implement the fast exit policy for the remainder of the desired voltage transition as shown in FIG. 8.

Using the audio noise mitigation approach of various embodiments, it may be possible to reduce the audio noise associated with periodic transitions from low power states, for example.

Thus, various embodiments of a method and apparatus for audio noise mitigation are described. In the foregoing specification, the invention has been described with reference to specific example embodiments thereof. It will, however, be appreciated that various modifications and changes may be made thereto without departing from the broader spirit and scope of the invention as set forth in the appended claims. For example, while an exit from the C4 state to an active state is described for purposes of example, it will be appreciated that a similar approach may be applied to transitions between other power states and/or between one of the C4 or active state and another state using similar or different signals. Further, while specific signals are referred to herein for purposes of illustration, it will be appreciated that different signals having different names and/or functions may be used for other embodiments. For some embodiments, not all periodic exit events will result in invocation of the slow exit policy. For some embodiments, it may be desirable to apply the slow exit policy to only a subset of possible periodic exit events. The specification and drawings are, accordingly, to be regarded in an illustrative rather than a restrictive sense.

What is claimed is:

1. A method comprising:
providing a first voltage associated with a first power management state;
receiving a first signal responsive to an indication associated with a periodic exit event; and
responsive to the first signal, initiating a transition to a second voltage associated with a second state, a first rate of the transition to the second voltage being slower than a second rate associated with a voltage transition in response to a non-periodic exit event.

2. The method of claim 1 wherein receiving the first signal responsive to an indication associated with a periodic exit event includes receiving a signal responsive to at least one of an interrupt request and a timer.

3. The method of claim 1 further including
receiving a second signal responsive to an indication associated with a non-periodic exit event during the transition to the second voltage at the first rate; and
responsive to the second signal, adjusting the transition to the second voltage to the second rate.

4. The method of claim 3 wherein
receiving the first signal responsive to the indication associated with a periodic exit event includes determining that an indicator signal responsive to the occurrence of a periodic exit event has been asserted.

5. The method of claim 4 wherein
receiving the first signal responsive to the indication associated with a periodic exit event includes determining that an indicator signal responsive to a predicted occurrence of a periodic exit event has been asserted prior to the occurrence of the exit event.

6. A method comprising:
receiving a signal responsive to an indication associated with an exit event while providing a first voltage;
if the indication is associated with at least a first type of periodic exit event, initiating a transition to a second, higher voltage at a first rate; and
if the indication is associated with a second type of exit event, initiating a transition to the second, higher voltage at a second faster rate.

7. The method of claim 6 wherein
receiving the signal responsive to the indication associated with an exit event includes receiving the signal responsive to the indication that an exit event has occurred.

8. The method of claim 6 wherein
receiving the signal responsive to the indication associated with an exit event includes receiving the signal responsive to at least one of an indication that an exit event has occurred and a warning of an upcoming periodic exit event.

9. The method of claim 8 further comprising
receiving the signal responsive to the indication associated with the second type of exit event during the transition to the second voltage at the first rate; and
transitioning to the second rate for the remainder of the transition in response to receiving the signal responsive to the indication associated with the second type of exit event.

10. An apparatus comprising:
a voltage source to provide at least a first voltage and a second higher voltage;
an exit policy control module responsive to at least a first signal to indicate one of a slow exit policy and a fast exit policy depending on a type of the exit event; and
a slew rate controller responsive to the exit policy control module to control a rate of transition between the first voltage and the second voltage.

11. The apparatus of claim 10 wherein
the exit policy control module is to indicate a slow exit policy if the first signal is responsive to an indication associated with at least a first type of periodic exit event.

12. The apparatus of claim 11 wherein
the slew rate controller is further responsive to the exit policy control module to adjust the rate of transition between the first voltage and the second voltage during a transition associated with a slow exit policy in response to receiving a second signal responsive to an indication of an exit event associated with a fast exit policy.

13. The apparatus of claim 10 wherein
the exit policy control module is to indicate a fast exit policy if the first signal is responsive to an indication associated with a non-periodic exit event.

14. The apparatus of claim 10 wherein the first signal is responsive to an indication associated with at least one of an occurrence of an exit event and a predicted occurrence of a periodic exit event.

15. The apparatus of claim 14 wherein the first signal is responsive to at least one of a timer and an interrupt source.

16. A system comprising:
a bus to communicate information;
a processor coupled to the bus to process instructions;
a battery adapter to receive a battery capable of providing power to the system; and
a voltage regulator to provide an operating voltage to the processor, the voltage regulator being responsive to a first signal responsive to an indication associated with an exit event to control a rate of transition from a first lower voltage to a second higher voltage depending on a type of the exit event.

17. The system of claim 16 wherein
if the exit event is at least a first type of periodic exit event, the voltage regulator is to control the transition to occur at a first slower rate, and if the exit event is a second type of exit event, the voltage regulator is to control the transition to occur at a second faster rate.

18. The system of claim 17 wherein
the indication associated with the exit event is at least one of an indication of an occurrence of an exit event and an early warning signal of an upcoming periodic exit event.

19. The system of claim 18 further comprising at least a first interrupt source and a first timer, the first signal being responsive to one of the first interrupt source and the first timer.

20. The system of claim 16 wherein the voltage regulator is further to receive a second signal,
a first one of the first and second signals being responsive to at least one of an indication of a periodic exit event, and an early warning signal indicating an upcoming periodic exit event,
a second one of the first and second signals indicating a different type of exit event.

21. The system of claim 20 wherein
the voltage regulator is responsive to the second signal to control a transition to the second voltage at a first faster rate, and is responsive to the first signal, if the second signal does not indicate a faster transition, to control a transition to the second voltage at a second slower rate.

22. The system of claim 21 wherein
during a transition at the second slower rate, the voltage regulator is responsive to the second signal to transition to the first faster rate.

23. The system of claim 21 further comprising:
at least a first timer and a first interrupt source, the first signal being responsive to at least one of the first timer and the first interrupt source as indications associated with at least one of the periodic exit event or the early warning signal.

24. The system of claim 23 wherein the at least first interrupt source is according to one of an 8259 interrupt model and an Advanced Programmable Interrupt Controller (APIC) interrupt model.

25. The system of claim 16 wherein the first lower voltage is associated with a first low power state and the second voltage is associated with one of a second lower power state and an active state.

* * * * *